(12) United States Patent
Milbank

(10) Patent No.: US 11,679,718 B2
(45) Date of Patent: Jun. 20, 2023

(54) ENHANCED FLEXIBLE GRIPPER PAD FOR TOWING MIRROR CLAMP

(71) Applicant: Milenco Limited, Buckinghamshire (GB)

(72) Inventor: Frederick Nigel Milbank, Buckinghamshire (GB)

(73) Assignee: Milenco Innovation Limited, Port St Mary (IM)

( * ) Notice: Subject to any disclaimer, the term of this patent is extended or adjusted under 35 U.S.C. 154(b) by 0 days.

(21) Appl. No.: 17/465,451

(22) Filed: Sep. 2, 2021

(65) Prior Publication Data

US 2022/0073002 A1 Mar. 10, 2022

(30) Foreign Application Priority Data

Sep. 7, 2020 (GB) ...................................... 2013997

(51) Int. Cl.
*B60R 1/078* (2006.01)
*G02B 7/182* (2021.01)

(52) U.S. Cl.
CPC .............. *B60R 1/078* (2013.01); *G02B 7/182* (2013.01)

(58) Field of Classification Search
CPC ................................ B60R 1/078; G02B 7/182
USPC ......................................... 358/871; 359/872
See application file for complete search history.

(56) References Cited

U.S. PATENT DOCUMENTS

| 1,760,346 | A | 5/1930 | Correa |
| 3,790,117 | A * | 2/1974 | Winkler ................. B60R 1/081 |
| | | | 359/865 |
| 4,486,075 | A | 12/1984 | Cohen |
| 4,794,675 | A | 1/1989 | Bisconti |
| 5,165,081 | A | 11/1992 | Drumheller |
| 5,259,582 | A * | 11/1993 | DeLange, III ........... B62J 29/00 |
| | | | 248/481 |
| 6,132,051 | A | 10/2000 | Morell et al. |
| 6,601,813 | B1 * | 8/2003 | Kager .................... F16M 13/00 |
| | | | 248/314 |
| 7,150,538 | B2 * | 12/2006 | Vander Horst ......... B60R 1/078 |
| | | | 359/872 |
| 9,205,779 | B1 * | 12/2015 | Liu ........................ B60R 1/078 |
| 9,421,912 | B1 * | 8/2016 | Hu ......................... B60R 1/078 |
| 11,235,705 | B1 * | 2/2022 | Yuan ...................... B60R 1/076 |
| 2006/0086571 | A1 * | 4/2006 | Hubble ................. A01M 31/00 |
| | | | 182/187 |
| 2008/0239532 | A1 * | 10/2008 | Wu ........................ B60R 1/078 |
| | | | 359/872 |

(Continued)

FOREIGN PATENT DOCUMENTS

DE 202005016734 U1 12/2005
EP 1767404 A1 3/2007

(Continued)

*Primary Examiner* — Ricky D Shafer

(74) *Attorney, Agent, or Firm* — Burns & Levinson LLP; Bruce D. Jobse

(57) ABSTRACT

Apparatus 10 has a mirror assembly 12, an arm 14 connected to the mirror assembly 12, and a clamp 18 mounted by the arm 14 and for connecting to a vehicle wing mirror 42. The clamp 18 has a frame 26 and a movable clamping member 28, with the clamping member 28 including an engaging portion 36. The engaging portion 36 includes a flexible concave engaging surface 40. The engaging portion 36 of the movable clamping member 28 has two curved layers 44 and 46 of different materials.

10 Claims, 8 Drawing Sheets

(56) References Cited

U.S. PATENT DOCUMENTS

| | | | | |
|---|---|---|---|---|
| 2014/0153123 A1* | 6/2014 | Hancock | ................ | B60R 1/06 |
| | | | | 359/872 |
| 2015/0022912 A1* | 1/2015 | Smith | ................ | G02B 7/182 |
| | | | | 359/865 |
| 2015/0098145 A1* | 4/2015 | Milbank | ................ | G02B 7/182 |
| | | | | 248/229.12 |
| 2015/0183374 A1* | 7/2015 | Liu | ................ | B60R 1/078 |
| | | | | 359/865 |

FOREIGN PATENT DOCUMENTS

| | | | |
|---|---|---|---|
| FR | 2870901 | A1 | 12/2005 |
| GB | 2240309 | A | 7/1991 |
| GB | 2244087 | A | 11/1991 |
| GB | 2439953 | A | 1/2008 |
| GB | 2444919 | A | 6/2008 |
| GB | 2481626 | A | 1/2012 |
| GB | 2488775 | * | 5/2013 |
| GB | 2529687 | A | 3/2016 |
| WO | 8908180 | A1 | 9/1989 |

* cited by examiner

ENHANCED FLEXIBLE GRIPPER PAD FOR TOWING MIRROR CLAMP

This invention relates to apparatus including a mirror assembly, commonly called a towing mirror. Such apparatus can be used by vehicle drivers, for example when the vehicle is towing a wide load such as a caravan and the driver needs an extension to their conventional wing mirror in order to be able to see around the side of the wide load.

If a vehicle driver is towing a wide load, such as a car with a caravan, then it is advantageous, and in all or most jurisdictions a legal requirement, that the conventional vehicle wing mirror be extended, in order for the vehicle driver to be able to see behind and along the side of the wide load. To achieve this, it is known to provide apparatus, often referred to as a towing mirror, which includes a mirror and a device for fixing that mirror to the conventional wing mirror. However, as vehicle design has become more complicated and elaborate, there is a difficulty providing a towing mirror that will fit all, or at least the vast majority, of wing mirror designs.

United Kingdom Patent GB 2444919 describes an apparatus comprising a mirror assembly, an arm connected to the mirror assembly, and at least one bracket mounted on the arm, the bracket comprising a clamp for connecting to a vehicle wing mirror, where the clamp is rotatable about an axis substantially perpendicular to the arm. The clamp has a movable clamping member with an engaging portion having a guiding element engaging in a slot in the frame.

United Kingdom Patent GB 2481626 describes an improved gripper pad for a vehicle towing mirror clamp. The clamp comprises a frame and a movable clamping member and the clamping member including an engaging portion. The engaging portion includes a lower surface formed of a first surface and a second surface at an angle to the first surface. The lower surface of the engaging portion may be provided with grooves to further enhance the grip it provides.

United Kingdom Patent GB 2529687 describes a further improved gripper pad for a vehicle towing mirror clamp. The clamp comprises a frame and a movable clamping member and the clamping member including an engaging portion. The engaging portion includes an engaging surface including a longitudinal substantially central ridge and a longitudinal side ridge, each of the two ridges extending away from the engaging surface a distance greater than the remainder of the engaging surface.

While the towing mirrors described in these prior Patents have a number of fixing advantages in relation to the fixing of a towing mirror to a vehicle wing mirror, they do not provide a solution that is suitable for all shapes of wing mirrors, particular as new and more complex wing mirror shapes are produced by vehicle manufacturers, particularly those with enhanced aerodynamics and tapered edges.

It is therefore an object of the invention to improve upon the known art.

According to the present invention, there is provided apparatus comprising a mirror assembly, an arm connected to the mirror assembly, and a clamp mounted by the arm and for connecting to a vehicle wing mirror, the clamp comprising a frame and a movable clamping member, the clamping member including an engaging portion, wherein the engaging portion comprises a flexible concave engaging surface.

Owing to the invention, it is possible to provide a clamp that will have a better connection to a wider range of wing mirror shapes and sizes, through the provision of a clamp that has an engaging portion with a concave flexible engaging surface. The design of the engaging surface of the engaging portion of the clamp is such that, as the clamp is fixed in position, the contact between the engaging portion of the clamp and a vehicle wing mirror is as reliable as possible in terms of contacting securely as large an area of the wing mirror. Any compound curvature in the external surface of the wing mirror to which the clamp is being affixed is compensated for by the flexible concave curve of the engaging surface of the clamp. The engaging portion of the clamp connects securely to convex, flat and compound curved surfaces. The point of loading of the clamp is pulled forward, which leads to a greater surface area of grip between the engaging surface and the wing mirror. The foot of the clamp acts as hook in the connection to the wing mirror with a point of contact that is off centre, when viewed from the side. The engaging surface, which is flexible, is able to be easily deformed without breaking.

Preferably, the engaging portion of the movable clamping member comprises two curved layers of different materials. In a preferred embodiment, the engaging portion of the movable clamping member comprises a first layer of a stiff material such as a metal and a second layer of a flexible material such as rubber. The two different materials of the engaging portion provide different but complimentary functions within the operation of the clamp when the clamp is being fixed to a vehicle wing mirror. The first (internal) layer should be more rigid (less flexible) than the second (external) layer which should be more flexible than the first layer. The first layer could be a thin metal layer such as stainless steel (acting as a flexible spring) and the second layer could be rubber or a plastics material with similar properties to rubber. The first layer should also be flexible but its primary function is to provide stiffness. In an alternative embodiment, the engaging portion of the clamp is formed from a single flexible material such as a suitable plastics material.

As the user tightens the clamp onto the vehicle wing mirror, the engaging surface of the engaging portion of the movable clamping member contacts the external surface of the vehicle wing mirror and at this point the flexible concave engaging surface is extremely unlikely to have an external profile that matches exactly the external profile of the wing mirror to which the clamp is being connected. Therefore, the user will continue to tighten the clamp onto the wing mirror, which causes deformation of one or both of the two different layers of the engaging portion, essentially forcing the shape of the engaging surface of the engaging portion to match the shape of the wing mirror. The flexible outer layer will readily deform to match the shape, while the stiffer internal layer will resist any deformation, but will nevertheless be deformed in three dimensions to match the shape of the wing mirror. Once the clamp is fixed into its final position the stiffer (preferably metal) layer of the engaging portion will retain the shape into which it has been forced providing a very tight fix of the clamp onto the wing mirror.

Ideally, the concave engaging surface of the engaging portion of the movable clamping member comprises a plurality of longitudinal ridges. The provision of ridges running along the length of the engaging surface of the engaging portion assists in the gripping of the clamp onto the wing mirror to which it is fixed. The ridges tend to deform to assist in the flexibility of the engaging surface matching to the local shape of the wing mirror to which the clamp is connected.

Advantageously, the flexible concave engaging surface of the engaging portion of the movable clamping member comprises a plurality of holes. The presence of holes in the engaging surface of the engaging portion of the clamp has two main advantages. Firstly, the outer part of the engaging surface is more flexible as a result of the presence of holes in the engaging surface, since the holes allow the surrounding material to move and deform more under pressure, as the clamp is being tightened onto the wing mirror. Secondly, the holes allow water to flow away from the engaging surface, both when the clamp is being tightened into position and when the clamp is fixed in position in use. All vehicles are exposed to rainwater when they are being used and the provision of holes allows rainwater to flow away from the engaging surface of the clamp. Ideally, the holes present in the concave engaging surface pass through the second outer layer of (flexible) material and not through the first inner layer of a (stiff) material.

Embodiments of the present invention will now be described, by way of example only, with reference to the accompanying drawings, in which.

Figure 1:
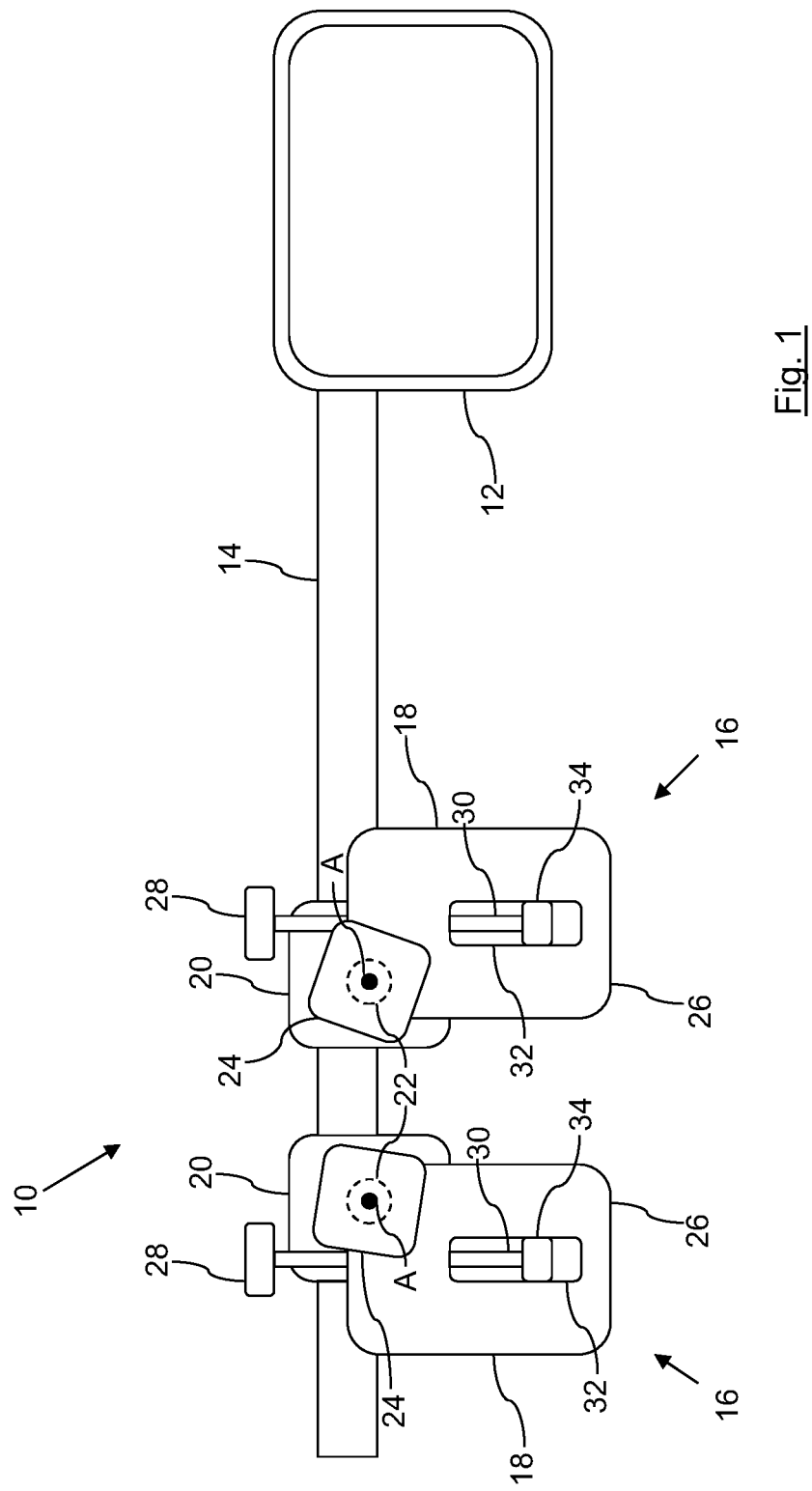
FIG. 1 is a front view of an apparatus including a mirror assembly.
Figure 2:
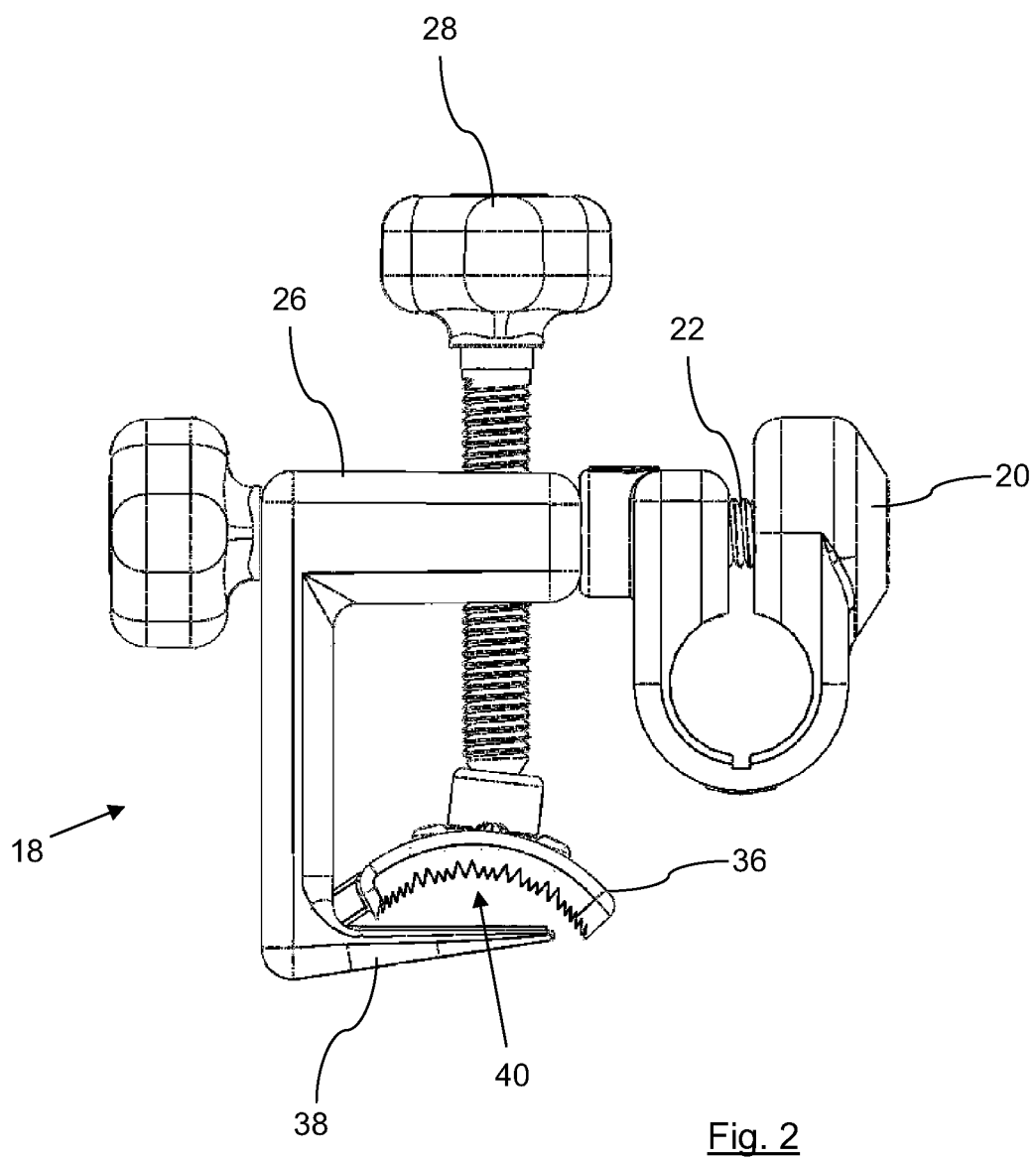
FIG. 2 is a side view of a clamp of the apparatus of FIG. 1.
Figure 3:
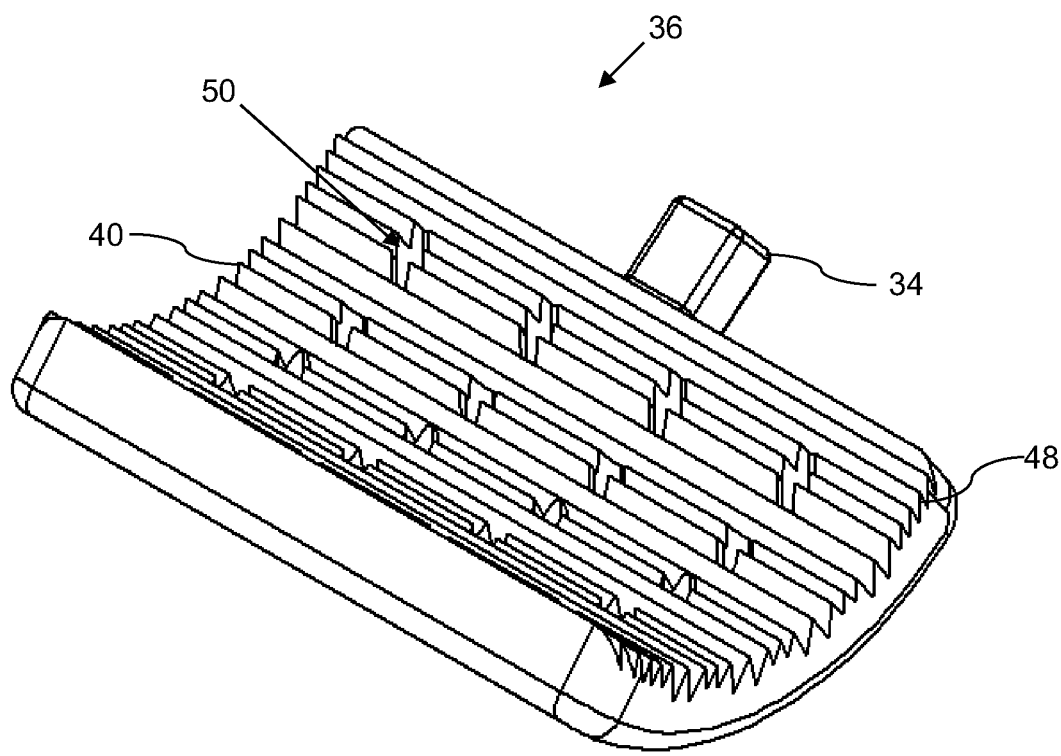
Figure 4:
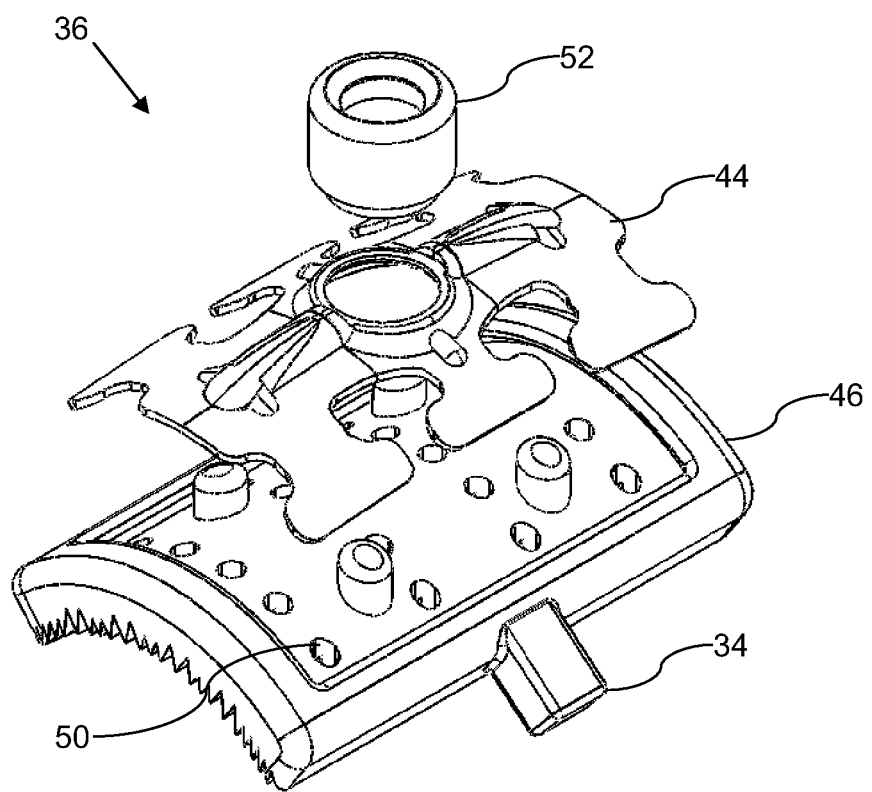
Figure 5:
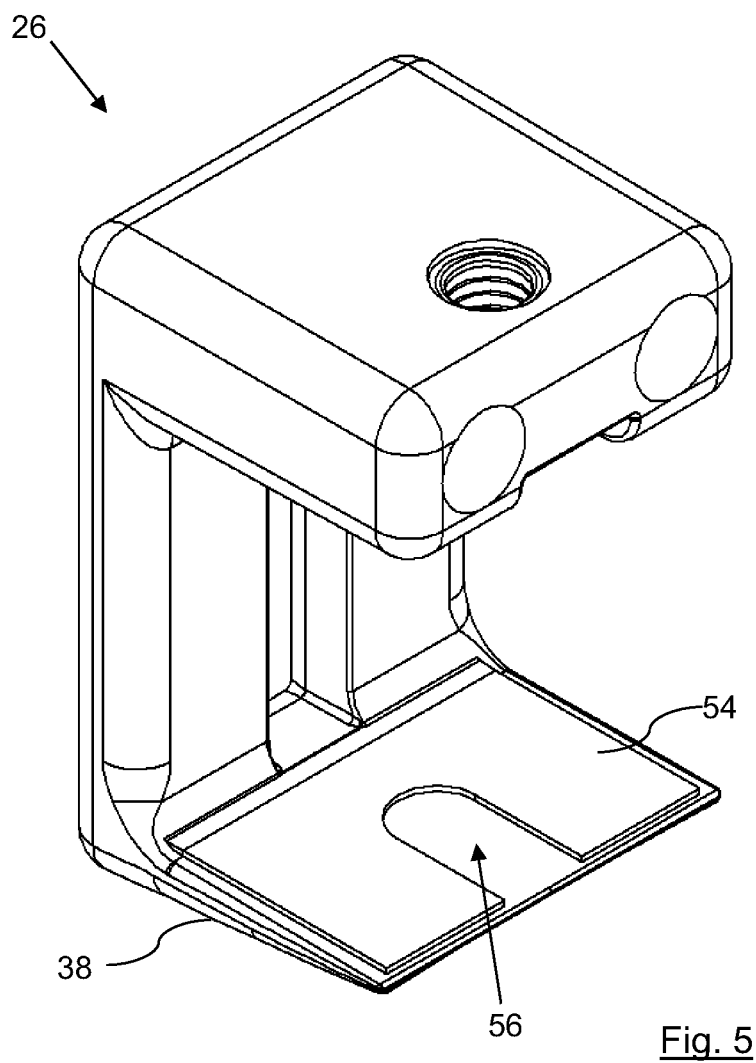
Figure 6:
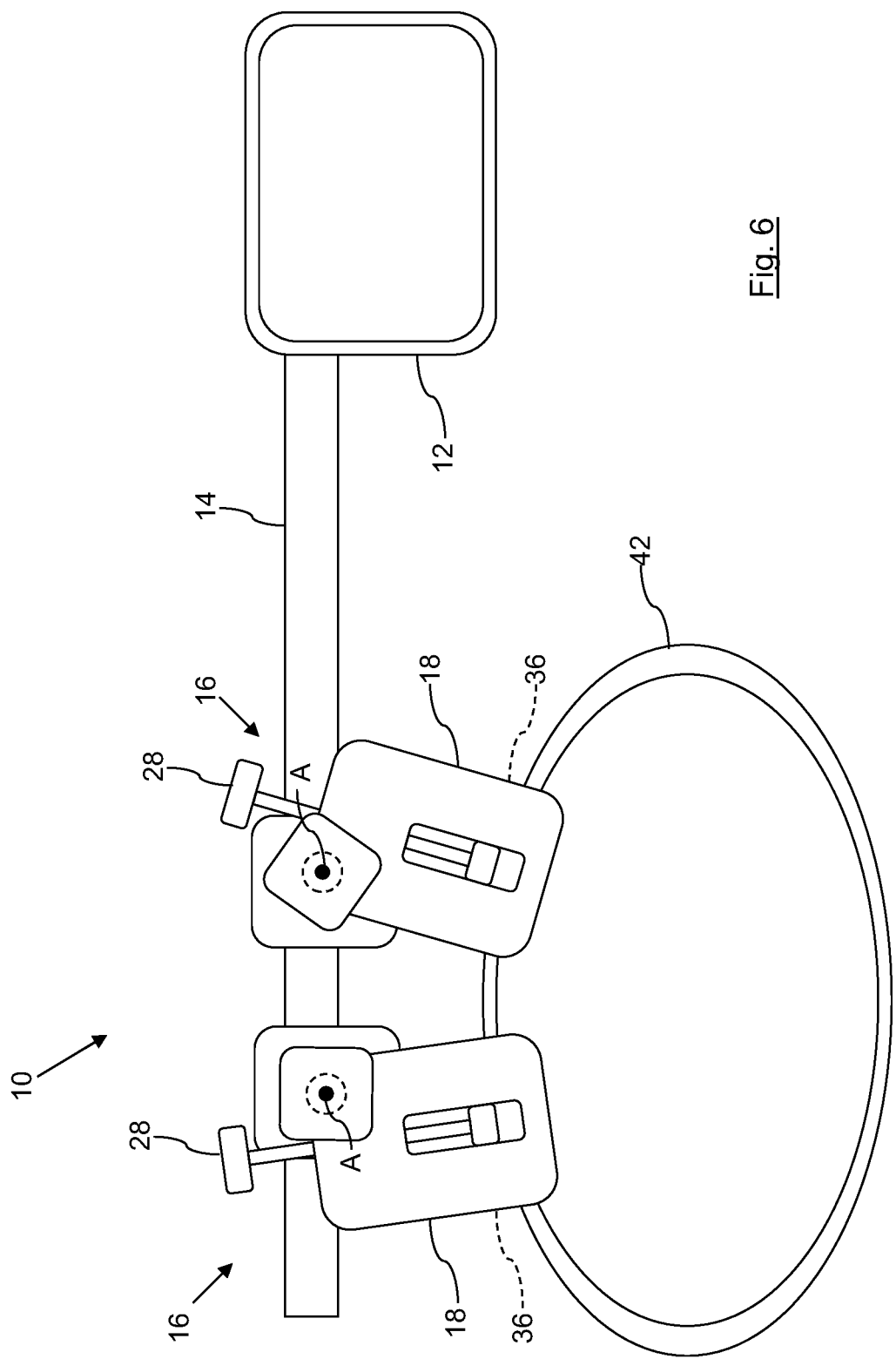
Figure 7:
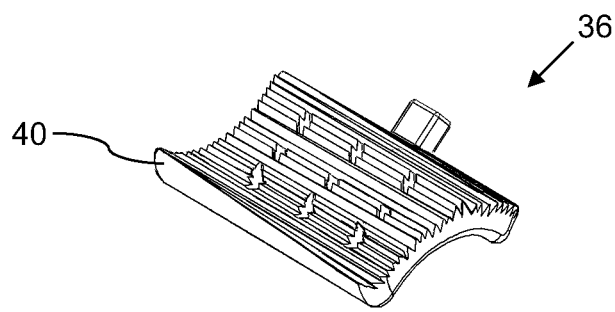
Figure 8:
Figure 9:
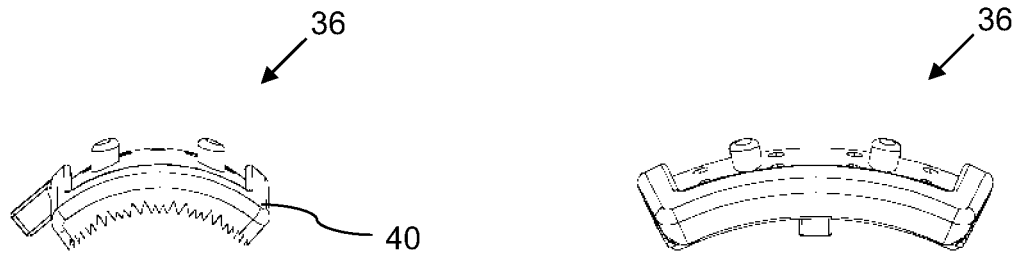
Figure 10:
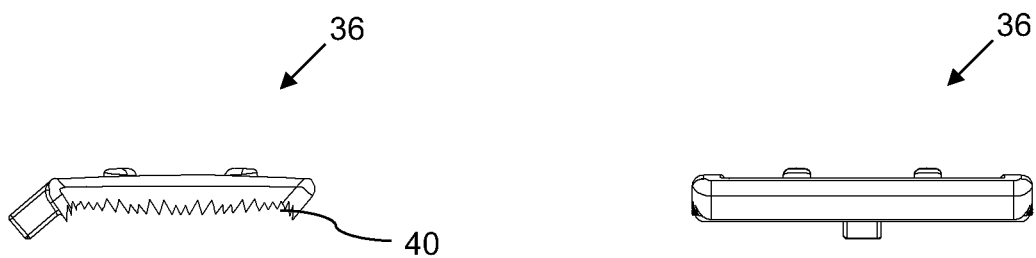

FIG. 3 is a perspective view from below of an engaging portion of the clamp of FIG. 2, FIG. 4 is an exploded perspective of the engaging portion, FIG. 5 is a perspective view of a frame of the clamp of FIG. 2, FIG. 6 is a front view of the apparatus of FIG. 1, in use, FIG. 7 is a perspective view from below of the engaging portion, in use, and FIGS. 8 to 10 are pairs of front and end views of the engaging portion, in different examples of use.

FIG. 1 shows the apparatus 10, which comprising a mirror assembly 12, an arm 14 connected to the mirror assembly 12, and two brackets 16 that are mounted on the arm 14. Each bracket 16 comprises a clamp 18 for connecting to a vehicle wing mirror (not shown in this Figure), and each clamp 18 is rotatable about an axis A, the axis A being substantially perpendicular to the arm 14 and substantially perpendicular to the upright direction of the respective clamp 18. The apparatus 10 is shown with two brackets 16, as a preferred embodiment, but the apparatus 10 could equally well be provided with only a single bracket 16 for fixing to the vehicle wing mirror.

Each bracket 16 also includes a fixing portion 20 for connecting the respective bracket 16 directly to the arm 14 of the apparatus 10, and a shaft 22 for connecting the clamp 18 to the fixing portion 20. The clamp 18 is rotatable about the shaft 22. Each bracket 16 also includes a locking element 24 for preventing rotation of the clamp 20 about the arm 14 and for tightening the bracket 16 onto the arm 14. The shaft 22, with the locking element 24 fixably mounted thereto can be a screw-thread about which the clamp 18 will rotate. The locking element 24 can be unscrewed to allow the clamp 18 to be rotated into position, and then the locking element 24 can be retightened to fix the clamp 18 in position, so that the clamp 18 can no longer move relative to the arm 14.

Since the apparatus 10 is designed as a towing mirror, a wide variety of different shapes of vehicle wing mirror can have the apparatus 10 fixed thereto. The provision of the rotation of the clamp 18 on each bracket 16 allows each clamp 18 to be positioned to best suit the local shape of the vehicle wing mirror to which the bracket 16 is being fixed. In particular, since there are provided two brackets 16 in the embodiment of FIG. 1, and both have clamps 18 that are rotatable independently of each other, a vehicle wing mirror with a varying shape can be connected to, without any impact on the performance of the towing mirror. Such a connection is relatively easy for a user to make themselves without any specialist assistance.

The apparatus 10 is designed to fit to a wing mirror of a vehicle such as a car. The apparatus 10 allows the driver of the car to be able to see behind them, by extending the mirror assembly 12 out and beyond a wide load, such as a caravan, that the car may be towing. The arm 14 of the apparatus 10 extends in the same plane as the mirror assembly 12, out to the side of the mirror assembly 12, and is at least twice the length of the mirror assembly 12. The arm 14 is also at least twice as long as the brackets 16 are wide, so that it can support at least two brackets 16. The arm 14 is an elongate rod-like construction, which mounts the brackets 16 so that they are alongside the mirror assembly 12.

Each clamp 18 comprises a frame 26 and a movable clamping member 28, the clamping member 28 movable relative to the frame 26 of the clamp 18. The clamping member 28 includes an engaging portion, which is shown in more detail in FIG. 2. The engaging portion is connected to a shaft 30 and is turnably mounted on the shaft 30. The frame 26 includes a guiding slot 32, and the engaging portion 36 includes a guiding element 34 that engages in the guiding slot 32. The purpose of the guiding element 34 and the slot 32 is to assist in the locating and moving of the engaging portion 36.

In FIG. 2, the clamp 18 is shown as it would be mounted by the arm 14 via the fixing portion 20 and the shaft 22, in order to provide the rotation of the clamp 18 around the axis A shown in FIG. 1. However, the clamp 18 could be mounted directly on the arm 14 (as opposed to the indirect mounting shown in FIG. 2) without the use of the fixing portion 20 and the shaft 22. The clamp 18 could be provided with a hole in its upper region through which the arm 14 would pass. The clamp 18 would be able to slide back and forth on the arm 14, but would not be rotatable through the axis A. This is a simpler mounting of the clamp 18, which however does not have the flexibility of the more complex mounting.

As shown in FIG. 2, the clamp 18 comprises a frame 26 and a movable clamping member 28, the clamping member 28 including an engaging portion 36, where the engaging portion 36 comprises a flexible concave engaging surface 40. The frame 26 of the clamp 18 comprises a foot 38 located opposite the engaging portion 36 of the movable clamping member 28, where the foot 38 of the frame 26 of the clamp 18 is provided with a flexible surface located opposite the engaging portion 36 of the movable clamping member 28.

The movable clamping member 28 moves relative to the frame 26 and the clamping of the clamp 18 occurs between the engaging surface 40 and the flexible surface of the foot 38. Rotation of the movable clamping member 28 causes the engaging portion 36 to rise or fall depending upon the direction in which the clamping member 28 is being turned. A user of the apparatus 10 will open the gap between the engaging portion 36 and the foot 38, manoeuvre the foot 38 in the space between the mirror and the outer shell of the vehicle wing mirror to which the towing mirror is being attached and then tighten the clamp 18 so that the engaging portion 36 firmly grips the vehicle wing mirror.

FIG. 3 shows a perspective view from below of the engaging portion 36 of the clamp 18, showing the flexible concave engaging surface 40. The engaging portion 36 of the movable clamping member 28, in this preferred embodiment, comprises two curved layers of different materials, shown in more detail in FIG. 4, although the engaging portion 36 can be formed from a single material. Here though, the engaging portion 36 of the movable clamping member 28 comprises a first layer of a stiff material such as a metal and a second layer of a flexible material such as rubber or the like. The two different materials provide different characteristics to the performance of the engaging portion 36. Primarily, the outer layer provides flexibility and the inner layer provides stiffness.

The two different layers of the engaging portion 36 provide different but complimentary functions within the operation of the clamp 18, as the clamp 18 is being fixed to a vehicle wing mirror by a user. The first internal layer is more rigid (less flexible) than the second external layer, which is more flexible than the first layer. The first layer is a thin metal layer such as stainless steel. The second layer is rubber or a suitable plastics material with similar properties to rubber. The first layer of metal is also flexible but the primary function of this layer is to provide stiffness to the engaging portion 36, which assists in the tight fixing of the engaging portion 36 to the vehicle wing mirror.

The concave engaging surface 40 of the engaging portion 36 of the movable clamping member 28 comprises a plurality of longitudinal ridges 48 that run from one side of the engaging portion 36 to the other side in parallel rows. These longitudinal ridges 48 assist in the gripping function provided by the engaging portion 36. The concave engaging surface 40 of the engaging portion 36 of the movable clamping member 28 also comprises a plurality of holes 50. The holes 50 present in the concave engaging surface 40 pass through the second (outer) layer of flexible material but not through the first (inner) layer 44 of stiff material. The holes 50 also assist in the gripping of the engaging portion 36 and also help in removing rainwater from the engaging portion 36, when in position on a vehicle wing mirror.

FIG. 4 shows an exploded view of the preferred embodiment of the engaging portion 36. The engaging portion 36 of the movable clamping member 28 comprises two curved layers 44 and 46 of different materials. The engaging portion 36 of the movable clamping member 28 comprises a first layer 44 of a stiff material, which here is metal, and a second layer 46 of a more flexible material, which here is rubber. When the user tightens the clamp 18 onto a wing mirror, this causes deformation of one or both of the two different layers 44 and 46 of the engaging portion 36, essentially forcing the shape of the engaging surface 40 of the engaging portion 36 to match the shape of the wing mirror.

The flexible outer layer 46 will readily deform to match the shape of the wing mirror, while the stiffer internal layer 44 will to a large extent resist any deformation, but will nevertheless be deformed in three dimensions to match the shape of the wing mirror. Once the clamp 18 is fixed into its final position the stiffer (preferably metal) layer 44 of the engaging portion 36 will retain the shape into which it has been forced providing a very tight fix of the clamp 16 onto the wing mirror. An end connector 52 can also be seen in this Figure, which connects the engaging portion 36 to the shaft 30 of the clamp 18. The end connector 52 allows the engaging portion 36 to move relative to the shaft 30 allowing the engaging portion 36 to take different angles with respect to the shaft 30.

FIG. 5 shows the frame 26 of the clamp 18 in more detail. The foot 38 of the frame 26 of the clamp 18 is provided with a flexible surface 54, which in use is located opposite the engaging portion 36 of the movable clamping member 28. The flexible surface 54 of the foot 38 of the frame 26 of the clamp 18 is provided with a slot 56 running across the flexible surface 54 of the foot 38. The flexible surface 54 is formed of a rubber or similar plastics material that is glued to the solid plastic frame 26 and provides a cushioning effect that further assists in the secure fastening of the clamp 18 to the vehicle wing mirror. The slot 56 allows movement of the flexible surface 54 as the clamp 18 is tightened into position.

FIG. 6 shows the towing mirror apparatus 10 fixed to a vehicle wing mirror 42. Each of the clamps 18 of the two brackets 16 mounted on the arm 14 have been rotated about their respective axis A, in opposite directions relative to each other. This rotation facilitates the fastening of the apparatus 10 to the wing mirror 42, since the shape of the wing mirror 42 is substantially oval. The lip of the mirror 42 is fixed between the respective engaging portions 36 of each clamp 18, and the user tightens the clamping member 28 to fasten the towing mirror apparatus 10 in place on the wing mirror 42.

The shape of the engaging surface 40 of the engaging portion 36 of each clamp 18 is such that the fixing between the engaging portions 36 and the wing mirror 42 is improved. The engaging surface 40 that makes up the lower surface of the engaging portion 36 provides a contact area with the wing mirror 42, which is enhanced by concave shape of the engaging surface 40. This is advantageous as many wing mirrors 42 have a top surface (where the clamps 18 will be located) that is three dimensionally curved, and the contact surface 40 of the engaging portions 36 of each clamp 18 provides a good method of clamping to the wing mirror 42.

The external layer of the engaging portion 36 of each clamp 18 is formed of soft rubber (or equivalent man-made material) and provides a certain amount of flexibility in its contact with the wing mirror 42. As the user tightens an individual clamp 18 onto the wing mirror 42, then as the engaging portion 36 contacts the exterior surface of the wing mirror 42, the soft material formation of the engaging portion 36 undergoes a certain amount of deformation to match the external shape of the wing mirror 42, as the user tightens the clamping member 28.

FIG. 7 shows an example of how the engaging portion 36 will look, in use, after connection to a wing mirror 42. As can be seen in the Figure, the flexible concave engaging surface 40, is still concave at the far end of the engaging surface 40, but has been deformed to a convex shape at the opposite end of the engaging surface 40. As the surface of the engaging surface 40 travels from one end of the engaging surface 40 to the other, intermediate curves and shapes have been formed that match the shape of the wing mirror 42 to which the engaging portion 36 is connected.

FIGS. 8 to 10 show further examples of the deformation of the engaging portion 36 in use. Each Figure shows a different example of the deformation seen from the front and side of the engaging portion 36. In FIG. 8, the concave engaging surface 40 has substantially matched the corresponding shape of the wing mirror to which it is affixed. In FIG. 9, the engaging surface 40 has become bent in three dimensions, with a concave curve being present in both perpendicular directions of the engaging surface 40. In FIG. 10, the engaging surface 40 has been squashed to the extent that it is almost completely flat.

What is claimed is:
1. Apparatus comprising:
a mirror assembly,
an arm connected to the mirror assembly, and
a clamp mounted by the arm and for connecting to a vehicle wing mirror, the clamp comprising a frame and a movable clamping member, the clamping member including an engaging portion, wherein the engaging portion comprises a flexible concave engaging surface comprising first and second curved layers of different materials.

2. Apparatus according to claim 1, wherein the material of the first layer of the engaging portion of the movable clamping member is less flexible than the material of the second layer of the engaging portion of the movable clamping member.

3. Apparatus according to claim 2, wherein the engaging portion of the movable clamping member comprises a first layer of a stiff material such as a metal and a second layer of a flexible material such as rubber or soft plastics.

4. Apparatus according to claim 1, wherein the concave engaging surface of the engaging portion of the movable clamping member comprises a plurality of longitudinal ridges.

5. Apparatus according to claim 1, wherein the concave engaging surface of the engaging portion of the movable clamping member comprises a plurality of holes.

6. Apparatus according to claim 5, wherein the holes present in the concave engaging surface pass through the second layer of material and not through the first layer of material.

7. Apparatus according to claim 1, wherein holes present in the concave engaging surface pass through the second layer of material and not through the first layer of material.

8. Apparatus according to claim 1, wherein the frame of the clamp comprises a foot located opposite the engaging portion of the movable clamping member.

9. Apparatus according to claim 8, wherein the foot of the frame of the clamp is provided with a flexible surface located opposite the engaging portion of the movable clamping member.

10. Apparatus according to claim 9, wherein the flexible surface of the foot of the frame of the clamp is provided with a slot running across the flexible surface of the foot.

* * * * *